United States Patent
Masuda et al.

(10) Patent No.: US 9,846,494 B2
(45) Date of Patent: Dec. 19, 2017

(54) INFORMATION PROCESSING DEVICE AND INFORMATION INPUT CONTROL PROGRAM COMBINING STYLUS AND FINGER INPUT

(71) Applicants: Tetsuro Masuda, Tokyo (JP); Makoto Kondo, Tokyo (JP); Hidemi Tsuji, Tokyo (JP); Makoto Hamatsu, Tokyo (JP)

(72) Inventors: Tetsuro Masuda, Tokyo (JP); Makoto Kondo, Tokyo (JP); Hidemi Tsuji, Tokyo (JP); Makoto Hamatsu, Tokyo (JP)

(73) Assignee: UEI CORPORATION, Tokyo (JP)

( * ) Notice: Subject to any disclaimer, the term of this patent is extended or adjusted under 35 U.S.C. 154(b) by 127 days.

(21) Appl. No.: 14/758,861

(22) PCT Filed: Apr. 23, 2013

(86) PCT No.: PCT/JP2013/061816
§ 371 (c)(1),
(2) Date: Jul. 1, 2015

(87) PCT Pub. No.: WO2014/106910
PCT Pub. Date: Jul. 10, 2014

(65) Prior Publication Data
US 2015/0338941 A1    Nov. 26, 2015

(30) Foreign Application Priority Data

Jan. 4, 2013    (JP) .................................. 2013-000268

(51) Int. Cl.
G06F 3/041    (2006.01)
G06F 3/0488    (2013.01)
G06F 3/0354    (2013.01)

(52) U.S. Cl.
CPC ........ *G06F 3/03545* (2013.01); *G06F 3/0412* (2013.01); *G06F 3/04883* (2013.01); *G06F 2203/04106* (2013.01)

(58) Field of Classification Search
CPC .............. G06F 3/03545; G06F 3/0412; G06F 3/04883; G06F 3/044; G06F 3/0488; G06F 2203/04106
See application file for complete search history.

(56) References Cited

U.S. PATENT DOCUMENTS 9,152,277 B1 *  10/2015 Beguin .................... G06F 3/044
9,164,658 B2 *  10/2015 Sadhvani .............. G06F 3/0482
(Continued)

FOREIGN PATENT DOCUMENTS

JP    2001-043003 A    2/2001
JP    2004-213312 A    7/2004
(Continued)

Primary Examiner — Ilana Spar
Assistant Examiner — Darlene M Ritchie
(74) Attorney, Agent, or Firm — Polsinelli PC

(57) ABSTRACT

An information processing device, such as a tablet computer or a smartphone, executes diverse processes by an intuitive operation combining a stylus pen and a finger in an input operation of information for performing the startup of an application program, the search for or editing of information, or the like. The information processing device is provided with an information input control program that identifies a first input such as a stylus pen and a second input such as a finger, identifies information input by the first input, recognizes a region designated by the second input, and from the information identified in the recognized region, executes a predetermined process that starts an application program, or searches for or edits information. It is possible to execute diverse processes an intuitive operation using two inputs.

2 Claims, 8 Drawing Sheets

(56) References Cited

U.S. PATENT DOCUMENTS

| | | | | |
|---|---|---|---|---|
| 9,395,908 B2* | 7/2016 | Miyazaki | | G06F 3/0486 |
| 9,411,498 B2* | 8/2016 | Hinckley | | G06F 3/03545 |
| 9,513,748 B2* | 12/2016 | Rihn | | G06F 3/0412 |
| 2004/0240739 A1* | 12/2004 | Chang | | G06F 3/04883 |
| | | | | 382/186 |
| 2007/0098263 A1* | 5/2007 | Furukawa | | G06F 3/03545 |
| | | | | 382/181 |
| 2008/0158185 A1* | 7/2008 | Westerman | | G06F 3/0488 |
| | | | | 345/173 |
| 2010/0188409 A1* | 7/2010 | Ooba | | G06F 3/0488 |
| | | | | 345/473 |
| 2010/0306705 A1* | 12/2010 | Nilsson | | G06F 3/0488 |
| | | | | 715/835 |
| 2012/0044179 A1* | 2/2012 | Hudson | | G06F 3/04883 |
| | | | | 345/173 |
| 2012/0075243 A1* | 3/2012 | Doi | | G06F 3/044 |
| | | | | 345/174 |
| 2012/0274583 A1* | 11/2012 | Haggerty | | G06F 3/0488 |
| | | | | 345/173 |
| 2014/0006920 A1* | 1/2014 | Li | | G06F 17/241 |
| | | | | 715/230 |
| 2014/0062913 A1* | 3/2014 | Lin | | G06F 3/044 |
| | | | | 345/173 |
| 2014/0201682 A1* | 7/2014 | Lee | | G06F 3/04817 |
| | | | | 715/846 |
| 2015/0002431 A1* | 1/2015 | Lee | | G06F 21/36 |
| | | | | 345/173 |
| 2015/0077369 A1* | 3/2015 | Nagahara | | G06F 3/0488 |
| | | | | 345/173 |
| 2015/0100874 A1* | 4/2015 | Pallakoff | | G06F 17/241 |
| | | | | 715/232 |
| 2015/0145820 A1* | 5/2015 | Huang | | G06F 3/044 |
| | | | | 345/174 |
| 2016/0216794 A1* | 7/2016 | Yoon | | G06F 3/041 |

FOREIGN PATENT DOCUMENTS

| | | |
|---|---|---|
| JP | 2006-155424 A | 6/2006 |
| JP | 2007-09118 A | 4/2007 |
| JP | 2008-108233 A | 5/2008 |
| JP | 2010-122987 A | 6/2010 |
| JP | 2010-182071 A | 8/2010 |
| JP | 2012-088807 A | 5/2012 |

\* cited by examiner

INFORMATION PROCESSING DEVICE AND INFORMATION INPUT CONTROL PROGRAM COMBINING STYLUS AND FINGER INPUT

CROSS REFERENCE TO RELATED APPLICATIONS

This application is a National Phase filing under 35 U.S.C. §371 of PCT/JP2013/061816 filed on Apr. 23, 2013; and this application claims priority to Application No. 2013-000268 filed in Japan on Jan. 4, 2013. The entire contents of each application are hereby incorporated by reference.

TECHNICAL FIELD

The present invention relates to information processing devices such as a tablet type computer and a smart phone, and an information input control program to be used in an information input processing in execution of retrieval or edit of information, startup of an application program or the like in these information processing devices.

BACKGROUND ART

In recent years, a portable network terminal having an information processing function such as a tablet type computer, a smart phone or the like spreads rapidly. In many cases, a touch screen (a touch panel) having an input device and a display device integrated with each other is used for inputting/outputting information to these terminals. The input to the touch screen is carried out by touching the screen, and a touch pen or a finger is mainly used as means for carrying out the input to the screen.

The input using the touch pen has an advantage that it is suitable for inputting small characters or performing a fine button operation or the like, and has a disadvantage that the touch pen should be carried. The input using one of fingers is not suitable for the input of small characters or the fine button operation but has an advantage that an operation can be performed intuitively and the touch pen does not need to be carried.

There is disclosed the invention related to an input device capable of performing input with a touch pen or a finger and identifying whether input means is the touch pen or the finger in order to make use of both characteristics (for example, see Patent Document 1). Moreover, there are disclosed the invention for changing an arrangement or a size of an operating button depending on whether the input means is the touch pen or the finger (for example, see Patent Document 2) and the invention for executing different functions depending on the input means such as input of information with the touch pen or page scroll with the finger (for example, see Patent Documents 3 and 4).

PRIOR ART DOCUMENT

Patent Document

Patent Document 1: Japanese Laid-Open Patent Publication No. 2001-43003
Patent Document 2: Japanese Laid-Open Patent Publication No. 2010-182071
Patent Document 3: Japanese Laid-Open Patent Publication No. 2008-108233
Patent Document 4: Japanese Laid-Open Patent Publication No. 2004-213312

SUMMARY OF THE INVENTION

Problem to be Solved

According to the inventions illustrated in the Patent Documents 3 and 4, it is possible to set to input, with a touch pen, a function for requiring a fine operation such as input of information and to input, with a finger, a preferred function for an intuitive operation such as page scroll, respectively. However, the functions to be enabled by them are limited to functions assigned previously to the respective input means. It is impossible to implement various functions or intuitive operations in combination of both of them.

The present invention has been made to deal with the problem and has an object to provide an information processing device and an information input control program which cause an operation for inputting information to retrieve or edit information, to start an application program or the like to contribute to implementation in execution of various processings by an intuitive operation in combination of two input means, that is, a touch pen and a finger in an information processing device such as a tablet type computer or a smart phone.

Means for Solving the Problem

In the present invention, an information processing device such as a tablet type computer or a smart phone which can input information by both first input means such as a touch pen and second input means such as a finger has a structure in which a predetermined processing, for example, retrieval or edit of information or startup of an application program is executed in combination of information input by the first input means and a region designated by the second input means. Consequently, it is possible to execute various processings by an intuitive operation using the two input means.

A first invention for solving the problem according to the present application is directed to an information processing device having a touch screen capable of inputting information by first input means and second input means, and includes means for identifying whether input means executing an input operation to the touch screen is the first input means or the second input means, means for identifying information input by the first input means and outputting the information to the touch screen if the input means executing the input operation is identified as the first input means, means for detecting the input operation executed by the second input means which designates a region having the information displayed on the touch screen, and means for executing a predetermined processing related to the information when detecting the input operation.

A second invention for solving the problem according to the present application is directed to an information processing device having a touch screen capable of inputting information by first input means and second input means, and includes means for identifying whether input means executing an input operation to the touch screen is the first input means or the second input means, means for recognizing a region on the touch screen designated by the input operation executed by the second input means if the input means executing the input operation is identified as the second input means, means for detecting the input operation executed by the first input means in the region and identifying information input by the input operation, and means for executing a predetermined processing related to the information when identifying the information.

A third invention for solving the problem according to the present application is directed to an information processing device having a touch screen capable of inputting information by first input means and second input means, and includes input means identifying means for identifying whether input means executing an input operation to the touch screen is the first input means or the second input means, means for identifying information input by the first input means and outputting the information to the touch screen if the input means executing the input operation is identified as the first input means by the input means identifying means, means for detecting the input operation executed by the second input means which designates a region having the information displayed on the touch screen, means for executing a first processing related to the information when detecting the input operation, means for recognizing a region on the touch screen designated by the input operation executed by the second input means if the input means executing the input operation is identified as the second input means by the input means identifying means, means for detecting the input operation executed by the first input means in the region and identifying information input by the input operation, and means for executing a second processing related to the information when identifying the information.

In the present invention, it is preferable that a touch pen should be used for the first input means and a finger should be used for the second input means. In the first invention, there is carried out an operation for designating a region, for example, circularly surrounding, with a finger, a character or the like displayed on the touch screen by input with the touch pen. Consequently, there is executed a processing such as retrieval of information, startup of an application program or the like which is related to information such as the displayed character. In the second invention, when a character or the like is written to the designated region by input with the touch pen after the operation for designating the region, that is, drawing a circle with the finger, there is executed the processing such as the startup of the application program, the retrieval of information or the like which is related to the information such as the written character. The third invention is obtained by combining them. In all of the inventions, it is possible to execute various processings specified by the character input with the touch pen or the like.

The first invention and the second invention may be characterized in that the predetermined processing is a processing using the information or a processing for demanding an operation for executing the processing using the information, or a processing specified by the information or a processing for demanding an operation for executing the processing specified by the information. The first processing and the second processing according to the third invention are also the same.

For example, a retrieval processing for setting the identified information as a keyword, a processing for filing the identified information, a processing for carrying out filing to enable edit and the like are relevant to the processing using information. Moreover, output of a selection button for causing a user to select a desirable one of processings using the identified information or the like is relevant to the processing for demanding an operation for executing the processing using information, for example. A processing for starting an application program corresponding to the identified information or the like is relevant to the processing specified by information, for example. Furthermore, the output of the selection button for selecting a desirable one of the processings specified by the identified information or the like is relevant to the processing for demanding the operation for executing the processing specified by the information, for example.

By thus carrying out the setting, it is possible to retrieve or edit information or to specify an application program to be start based on the information input with the touch pen. Therefore, the user can implement a desirable function by an intuitive operation for inputting a demanded processing with a touch pen to surround a displayed character or numeral with a finger.

The third invention may be characterized in that the first processing is a processing using the information or a processing for demanding an operation for executing the processing using the information, or the second processing is a processing specified by the information or a processing for demanding an operation for executing the processing specified by the information. The first input means may be a touch pen for a touch screen and the second input means may be a finger of an operator of the information output device.

Referring to the first processing and the second processing according to the third invention, the following combination is suitable. More specifically, the processing using the identified information, for example, retrieval of information or the like is executed as the first processing usually because a predetermined processing is requested to the information input earlier. The processing specified by the identified information, for example, the startup of the application program or the like is executed as the second processing usually because it is indicated to request a predetermined processing earlier and which processing is to be executed is then specified as a command.

Usually, input of information to be a retrieval target, a type of an application program to be started or the like is specified by a character, a numeral or the like. Therefore, it is preferable to use a touch pen capable of inputting fine information. It is sufficient to designate a rough range for a region where the input character or numeral is displayed. Therefore, it is preferable to use a finger of an operator.

The present invention can also be specified as an information input control program to be operated in the information processing device according to the present invention.

An information input control program corresponding to a first invention causes an information processing device including a touch screen capable of inputting information by first input means and second input means to execute the steps of identifying whether input means executing an input operation to the touch screen is the first input means or the second input means, identifying information input by the first input means and outputting the information to the touch screen if the input means executing the input operation is identified as the first input means, detecting the input operation executed by the second input means which designates a region having the information displayed on the touch screen, and executing a predetermined processing related to the information when detecting the input operation.

An information input control program corresponding to a second invention causes an information processing device including a touch screen capable of inputting information by first input means and second input means to execute the steps of identifying whether input means executing an input operation to the touch screen is the first input means or the second input means, recognizing a region on the touch screen designated by the input operation executed by the second input means if the input means executing the input operation is identified as the second input means, detecting the input operation executed by the first input means in the region and identifying information input by the input operation, and executing a predetermined processing related to the information when identifying the information.

An information input control program corresponding to a third invention causes an information processing device including a touch screen capable of inputting information by first input means and second input means to execute an input means identifying step of identifying whether input means executing an input operation to the touch screen is the first input means or the second input means, a step of identifying information input by the first input means and outputting the information to the touch screen if the input means executing the input operation is identified as the first input means at the input means identifying step, a step of detecting the input operation executed by the second input means which designates a region having the information displayed on the touch screen, a step of executing a first processing related to the information when detecting the input operation, a step of recognizing a region on the touch screen designated by an input operation executed by the second input means if the input means executing the input operation is identified as the second input means at the input means identifying step, a step of detecting the input operation executed by the first input means in the region and identifying information input by the input operation, and a step of executing a second processing related to the information when identifying the information.

The information input control program corresponding to the first invention and the second invention may be characterized in that the predetermined processing is a processing using the information or a processing for demanding an operation for executing the processing using the information, or a processing specified by the information or a processing for demanding an operation for executing the processing specified by the information. The first processing and the second processing in the information input control program corresponding to the third invention are also the same.

The information input control program corresponding to the third invention may be characterized in that the first processing is a processing using the information or a processing for demanding an operation for executing the processing using the information, and the second processing is a processing specified by the information or a processing for demanding an operation for executing the processing specified by the information. The first input means may be a touch pen for a touch screen and the second input means may be a finger of an operator of the information output device.

Effect of the Invention

According to the present invention, in an information processing device such as a tablet type computer or a smart phone which inputs information through a touch screen, execution of various processings such as retrieval or edit of information, startup of an application program and the like can be implemented by an intuitive operation in combination of two input means, that is, a touch pen and a finger. Thus, it is possible to expect enhancement in operability of an information processing device including a touch screen.

BRIEF DESCRIPTION OF THE DRAWINGS

FIG. 11 is a first flowchart showing a processing flow of an information input control program according to the present invention.

FIG. 12 is a second flowchart showing the processing flow of the information input control program according to the present invention.

MODE FOR CARRYING OUT THE INVENTION

An embodiment for carrying out the present invention will be described below in detail with reference to the drawings. The following description is only illustrative as the embodiment of the present invention and the present invention is not restricted to the embodiment.

Figure 1:
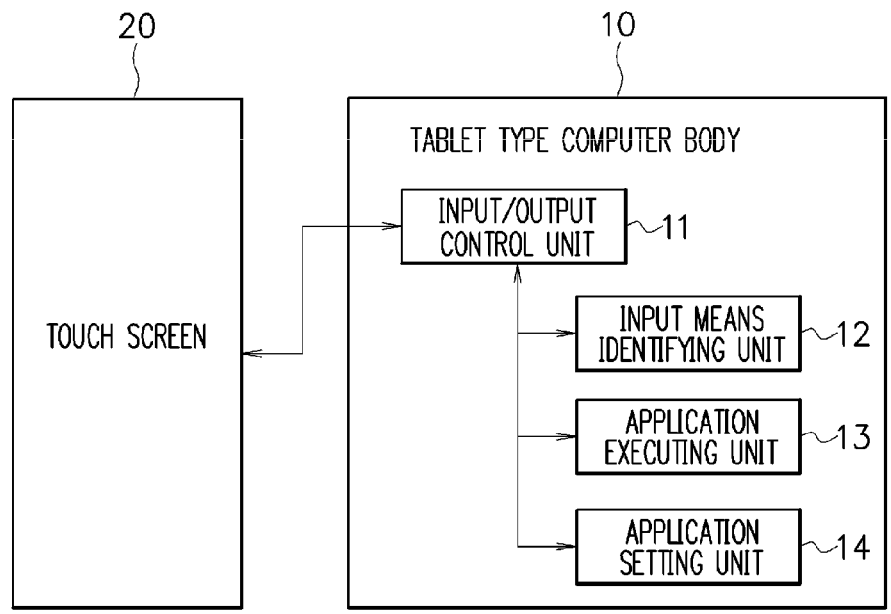
FIG. 1 is a block diagram showing a structure of an information processing device according to the present invention.

FIG. 1 shows an example of a structure of an information processing device according to the present invention. In the present invention, there is used an information processing device having an input/output function through a touch screen, for example, a tablet type computer, a smart phone or the like.

Information may be input/output to/from a tablet type computer body 10 by a unit including means to be used in execution of other input/output functions such as voice input or output to an external device in addition to a touch screen 20. At least input/output using the touch screen 20 can be carried out. An operation result obtained by the tablet type computer body 10 is displayed on the screen 20, and furthermore, a touch pen or a finger touches the screen or a character or a graphic is drawn to input information.

The tablet type computer body 10 is a computer including an auxiliary storage having a CPU, a main memory, an HDD or the like. All of an input/output control unit 11, an input means identifying unit 12 and an application executing unit 13 provided in the tablet type computer body 10 are functionally specified, and a program corresponding to each function is read from the auxiliary storage to a main memory and an arithmetic processing is executed by the CPU so that a predetermined function is implemented. A predetermined storage area in the auxiliary storage is assigned to an application setting unit 14.

The input/output control unit 11 executes a processing related to input/output of information to/from the touch screen 20. More specifically, there is executed a processing for accepting an operation for detecting contact of a touch pen or a finger with the touch screen 20 and pressing down a button displayed on the touch screen, identifying a character or a graphic drawn with the touch pen or the finger or outputting the identified character or graphic to the touch screen 20. A program corresponding to the input/output control unit 11 is mainly included in an operating system (OS) of the tablet type computer body 10 and may be operated as middleware for causing an OS and an application program to cooperate with each other in addition to the OS.

The input means identifying unit 12 executes a processing for identifying first input means such as a touch pen coming in contact with the touch screen 20 and second input means such as a finger. In the present invention, it is required that information can be input from the touch screen by both the first input means such as the touch pen and the second input means such as the finger, and furthermore, which input means carried out the input can be identified. However, no particular limitation is given to which method can enable the input of both of the input means (for example, it is also possible to use a touch screen obtained by combining an electromagnetic induction system corresponding to the input through the touch pen and an electrostatic capacitance system corresponding to the input through the finger or to employ an analog resistive film system capable of carrying out the input by both of them) or to which system identifies both of them (for example, it is possible to identify both of them depending on a detection range described in the prior art documents and to identify both of them depending on which system detected the input when using a touch screen obtained by combining the electromagnetic induction system and the electrostatic capacitance system corresponding to the input through the finger).

Various application programs including a Web browser, a camera application, a weather application, paint software, document creating software and the like correspond to the application executing unit 13. An information input control program according to the present invention serves to control execution of a predetermined processing such as startup of these application programs corresponding to the application executing unit 13, read of a file in the application programs, retrieval using input information as a keyword or edit of the input information, and corresponds to a part of functions of the input/output control unit 11.

A rule for determining which application program is to be started or which processing in the application program is to be executed is set to the application setting unit 14 corresponding to information such as a character or a graphic output to the touch screen 20.

On the assumption of the structure described above, explanation will be given to a first example of a screen transition on the touch screen 20 shown in FIGS. 2 to 4. The first example indicates a processing for demanding an operation for designating a region with the finger to be the second input means for information such as a character input with the touch pen to be the first input means, thereby executing a processing using the information such as a character, and more specifically serves to output a selection button for causing a user to select any of the processings to the touch screen 20.

First of all, the user operates the touch screen 20 to start an application program capable of inputting information with a touch pen such as paint software and a finger in the tablet type computer body 10, and performs an operation for writing a character (herein "tablet") on the touch screen 20 by using the touch pen to be the first input means.

Figure 2:
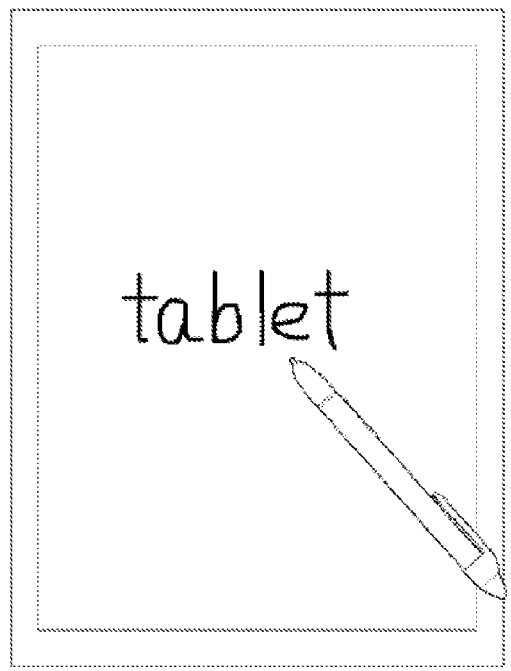
FIG. 2 is a first view according to a first example of a screen transition on a touch screen according to the present invention.

In the tablet type computer body 10 detecting the input operation, the input means identifying unit 12 identifies the input means as the touch pen, and a locus traced with the touch pen, that is, a written character is exactly output to the touch screen 20 by the input/output control unit 11 as shown in FIG. 2. An initial screen starting the tablet type computer body 10 may be set to serve as this input screen.

Figure 3:
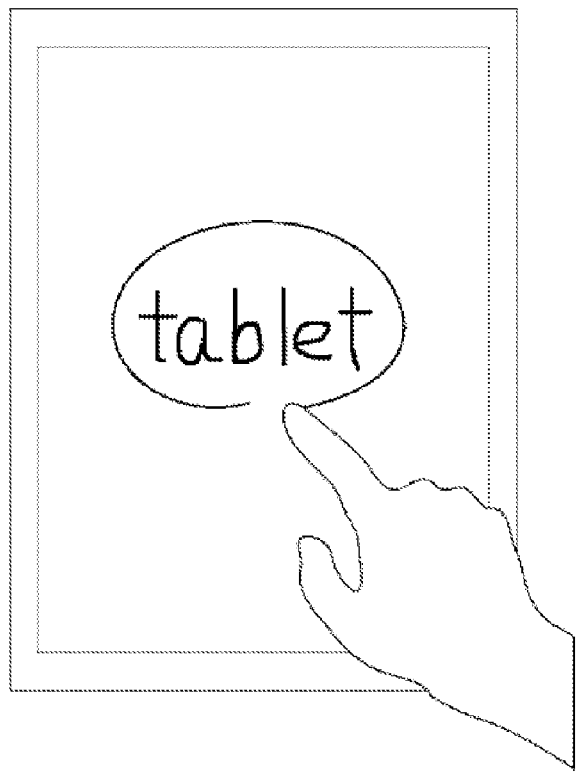
FIG. 3 is a second view according to the first example of the screen transition on the touch screen according to the present invention.

As shown in FIG. 3, next, the user performs an operation for drawing such a locus as to circularly surround the character displayed on the touch screen 20 with the finger to be the second input means. In the tablet type computer body 10 detecting this operation, the input means identifying unit 12 identifies the input means as the finger, and the following processing is executed while a locus traced with the finger is output to the touch screen 20 by the input/output control unit 11.

A character (herein "tablet") input earlier with the touch pen is displayed in a region traced with the finger on the touch screen 20. There is executed a processing for outputting a screen to cause the user to perform selection by pressing down the selection button as to which one of the following processings is to be executed, that is, a processing for demanding an operation for executing the processing using the identified character. The processings include a processing for identifying the character and using the identified character, a retrieval processing (corresponding to a selection button of "Web") for setting a character identified on Web as a keyword, a processing (corresponding to a selection button of "Note") for retrieving a file including the identified character stored in the tablet type computer body 10, and a processing (corresponding to a selection button of "Link") for filing and storing the identified character and linking the character to other files, Web pages or the like according to the example shown in FIG. 4.

Figure 4:
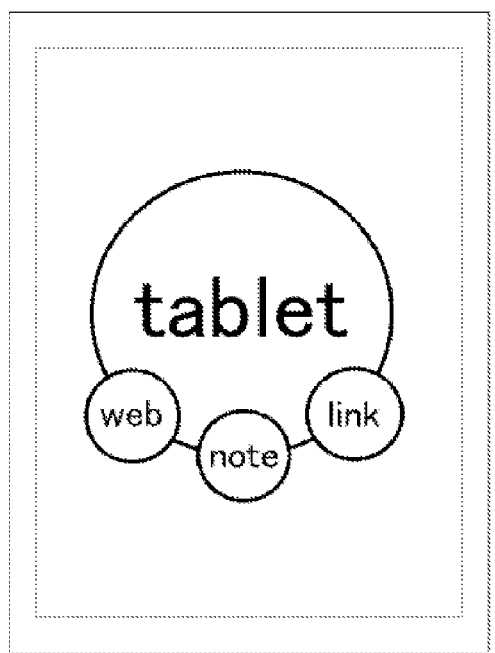
FIG. 4 is a third view according to the first example of the screen transition on the touch screen according to the present invention.

When the selection button is displayed as shown in an example of FIG. 4 and which one of the processings using the identified character is to be demanded by the user is selected by pressing down the selection button with the touch pen or the finger, an application such as a Web browser corresponding to the selected processing is started so that the selected processing is executed.

The information to be input with the touch pen and identified is not restricted to characters but may be intended for numerals, graphics or the like. Moreover, a locus surrounding a character or the like with the finger is not restricted to a circle if it can designate a region having the character or the like displayed thereon. Even if a locus perfectly surrounding a character or the like is not drawn, it is also possible to recognize that the region having the character or the like displayed thereon is designated by a locus clearly designating the character or the like, for example, by drawing an auxiliary line connecting both ends which overlaps with the character or the like to perfectly surround the character or the like.

Moreover, the processing to display the selection button and to be executed by pressing down the selection button is not restricted to the processing shown in the example of FIG. 4 but may serve to execute a processing for editing, copying or cutting the character or the like which is identified in the paint software or the document creating software, a processing for executing a predetermined calculation by setting the identified numeral as an argument when it is identified that the numeral is input with the touch pen or may be set to enable a change in these selectable processings. Furthermore, the method for demanding an operation to execute the processing using the information such as the identified character is not restricted to the output and press-down of the selection button shown in the example of FIG. 4 but may cause the user to request a desired processing by other methods.

Furthermore, the processing to be executed herein is not restricted to the processing using the information such as the identified character but may serve to execute a processing for demanding an operation for executing a processing specified by the information such as the identified character, for example, startup of an application program specified by the identified character.

Subsequently, description will be given to a second example of a screen transition on the touch screen 20 shown in FIGS. 5 to 7. The second example serves to designate a region with the finger to be the second input means for information such as a character input with the touch pen to be the first input means and to execute a processing using the information such as the character.

First of all, the user operates the touch screen 20 to start an application program capable of inputting information with a touch pen such as paint software and a finger in the tablet type computer body 10, and performs an operation for writing a character (herein "Weather") on the touch screen 20 by using the touch pen to be the first input means.

Figure 5:
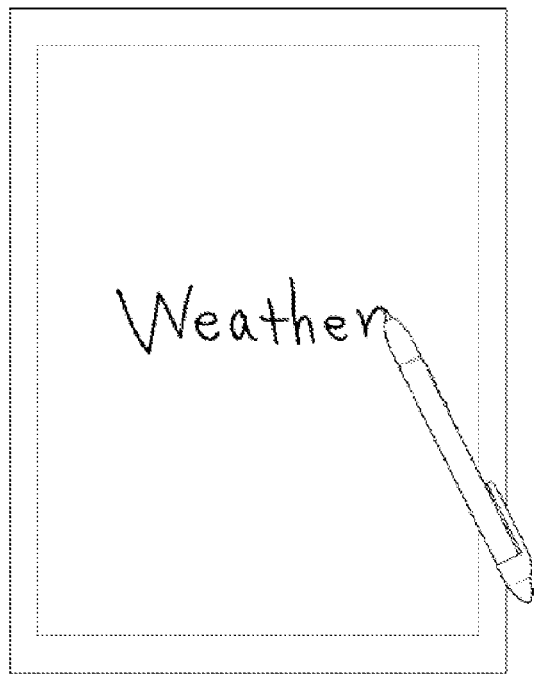
FIG. 5 is a first view according to a second example of the screen transition on the touch screen according to the present invention.

In the tablet type computer body 10 detecting the input operation, the input means identifying unit 12 identifies the input means as the touch pen, and a locus traced with the touch pen, that is, a written character is exactly output to the touch screen 20 by the input/output control unit 11 as shown in FIG. 5. An initial screen starting the tablet type computer body 10 may be set to serve as this input screen.

Figure 6:
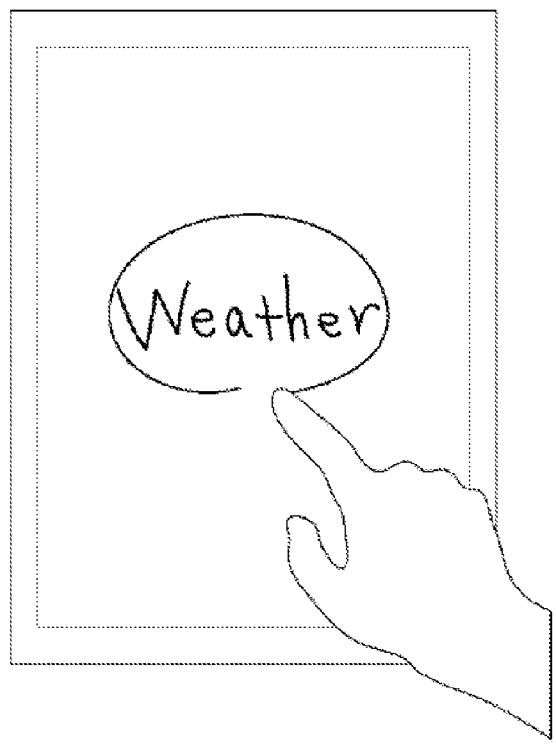
FIG. 6 is a second view according to the second example of the screen transition on the touch screen according to the present invention.
Figure 7:
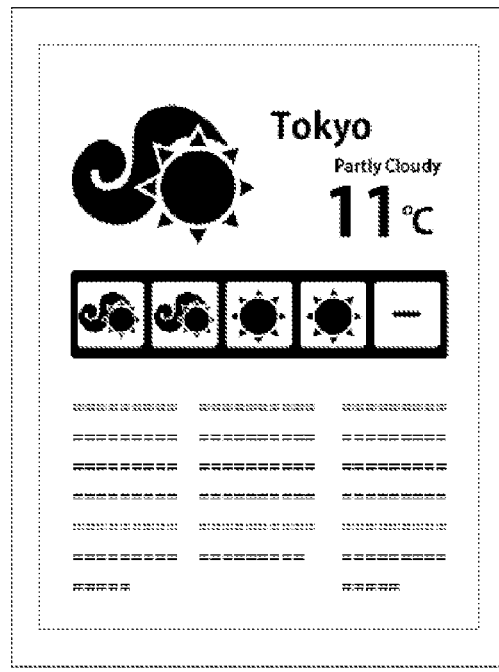
FIG. 7 is a third view according to the second example of the screen transition on the touch screen according to the present invention.

As shown in FIG. 6, next, the user performs an operation for drawing such a locus as to circularly surround the character displayed on the touch screen 20 with the finger to be the second input means. In the tablet type computer body 10 detecting this operation, the input means identifying unit 12 identifies the input means as the finger, and the following processing is executed while a locus traced with the finger is output to the touch screen 20 by the input/output control unit 11.

The character (herein "Weather") input earlier with the touch pen is displayed in the region on the touch screen 20 which is traced with the finger. The character is identified, an application program specified by the identified character is confirmed by reading a rule of the application setting unit 14, and a corresponding application program (herein a weather application) is started by the application executing unit 13 to display the information on the touch screen 20 as shown in FIG. 7.

Although a processing to be executed after detecting the input with the finger is specified by the information such as the identified character, it is not restricted to the startup of the application program. For example, it is also possible to execute a processing for inverting white and black over the whole touch screen 20 if the identified character is "invert" and erasing the information displayed on the touch screen 20 if the identified character is "reset".

Moreover, the processing to be executed herein is not restricted to the processing specified by the information such as the identified character but may be applied to execution of a processing using the identified character as in execution of a retrieval processing using the identified character on the Web as a keyword after startup of a Web browser, for example.

Moreover, the information to be input with the touch pen and identified is not restricted to characters but may be intended for graphics (for example, a graphic of a sun is identified in the same manner as the character of the "Weather"). Furthermore, a locus surrounding a character or the like with the finger is not restricted to a circle if it can designate a region having the character or the like displayed thereon. Even if a locus perfectly surrounding a character or the like is not drawn, it is possible to recognize that the region having the character or the like displayed thereon is designated by a locus clearly designating the character or the like, for example, by drawing an auxiliary line connecting both ends which overlaps with the character or the like to perfectly surround the character or the like.

Subsequently, description will be given to a third example of a screen transition on the touch screen 20 shown in FIGS. 8 to 10. The third example serves to input information such as a character with the touch pen to be the first input means to a region designated with the finger to be the second input means, thereby executing a processing using the information such as a character.

First of all, the user starts an application program capable of inputting information with a touch pen such as paint software and a finger by using the tablet type computer body 10, and performs an operation for drawing a locus of a surrounding graphic such as an elliptical shape on the touch screen 20 by using the finger to be the second input means.

Figure 8:
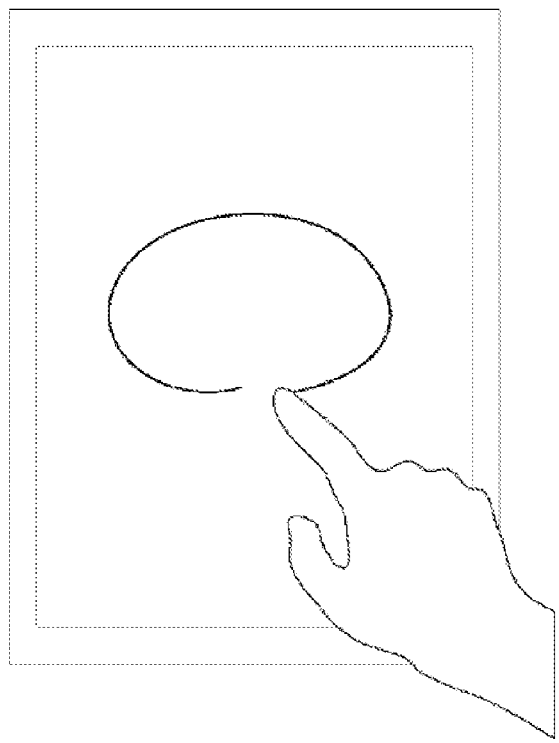
FIG. 8 is a first view according to a third example of the screen transition on the touch screen according to the present invention.

In the tablet type computer body 10 detecting the input operation, the input means identifying unit 12 identifies the input means as the finger, and the locus of the surrounding graphic such as the elliptical shape which is traced with the finger as shown in FIG. 8 is output to the touch screen 20 by the input/output control unit 11 and a region designated by the surrounding graphic is recognized.

Figure 9:
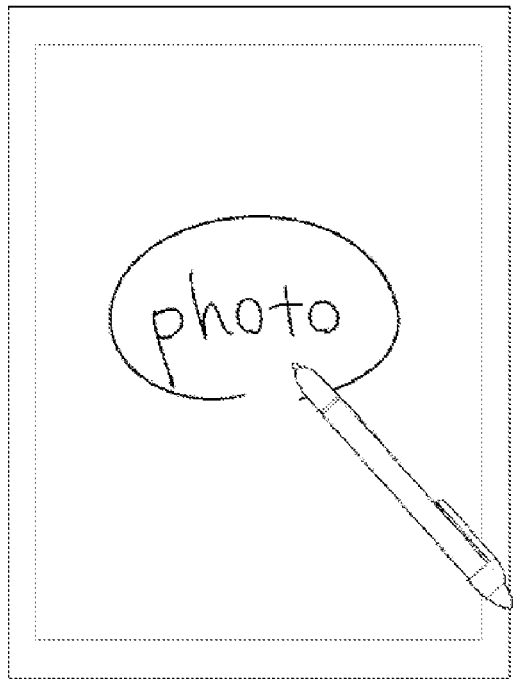
FIG. 9 is a second view according to the third example of the screen transition on the touch screen according to the present invention.
Figure 10:
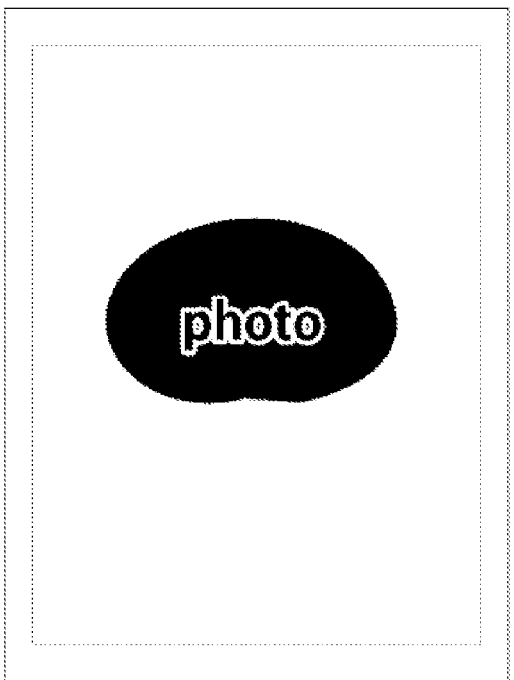
FIG. 10 is a third view according to the third example of the screen transition on the touch screen according to the present invention.
Figure 1:
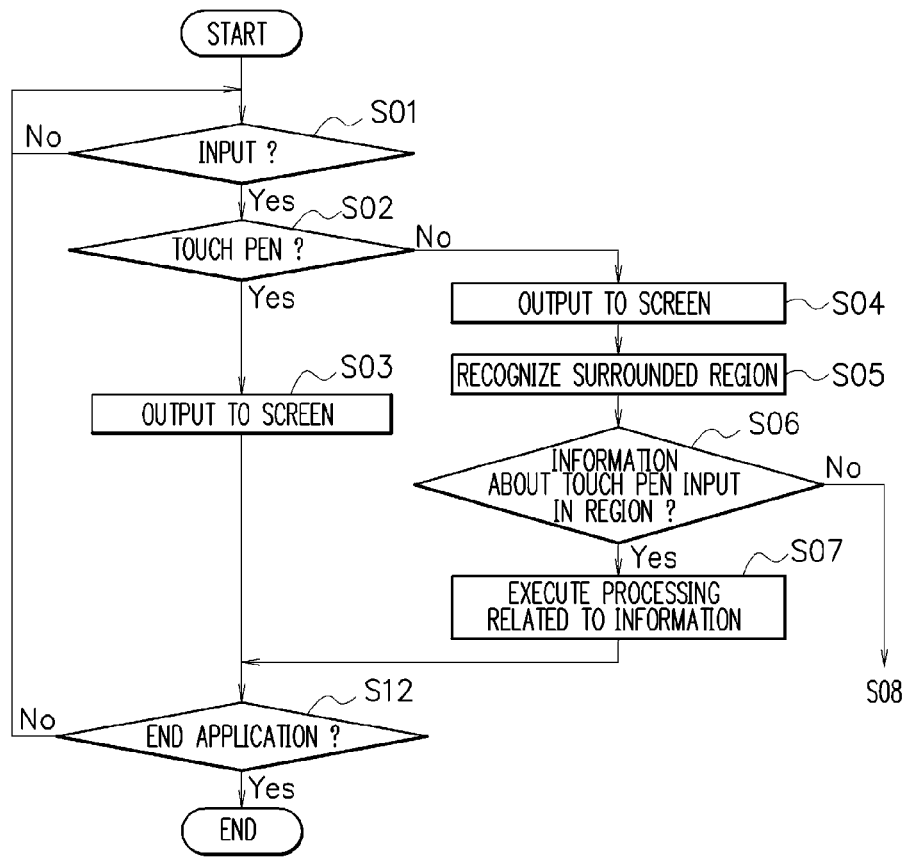
Figure 1:
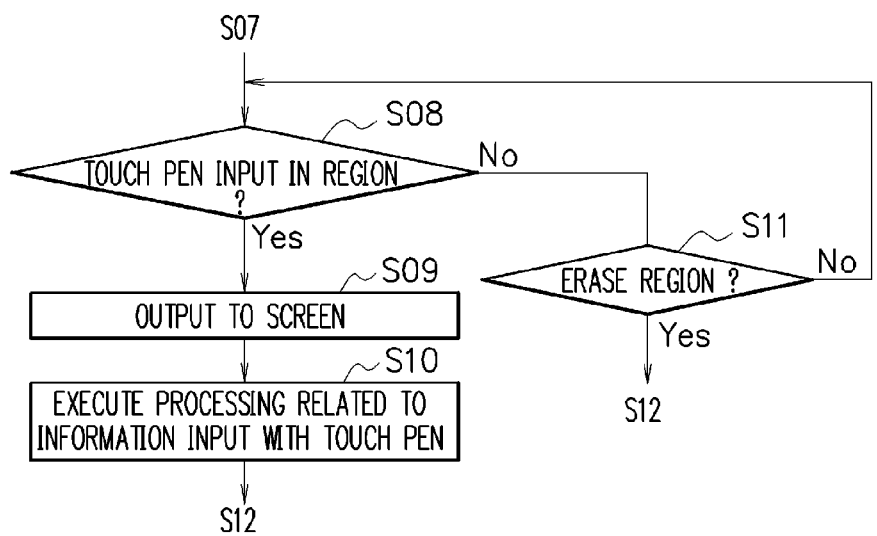

As shown in FIG. 9, next, the user inputs a character (herein "photo") to the region having the surrounding graphic displayed on the touch screen 20 by using the touch pen to be the first input means. In the tablet type computer body 10 detecting the input operation, the input means identifying unit 12 identifies the input means as the touch pen, and the following processing is executed while a locus traced with the touch pen, that is, a written character is output to the touch screen 20 by the input/output control unit 11.

There is identified the character (herein "photo") input with the touch pen to the region where the surrounding graphic drawn with the finger is displayed, and an application program corresponding to the identified character is confirmed by reading the rule of the application setting unit 14 to cause the application executing unit 13 to start a corresponding application program (herein a camera application). Although the screen on the touch screen 20 makes a transition to an operation screen of the application program, a region for displaying the operation screen of the application program may be a whole surface of a window opened onto the touch screen 20 or may be displayed in the region of the surrounding graphic drawn with the finger as shown in FIG. 10 (in the example of FIG. 10, it is assumed that a picture of a finder output by the camera application is displayed on a black portion).

Although a processing to be executed after detecting the input with the touch pen is specified by the information such as the identified character, it is not restricted to the startup of the application program in the same manner as in the second example described above. For example, it is also possible to execute a processing for inverting white and black over the whole touch screen 20 if the identified character is "invert" and for erasing the information displayed on the touch screen 20 if the identified character is "reset".

In the same manner as in the second example described above, moreover, the processing to be executed herein is not restricted to the processing specified by the information such as the identified character but may be applied to execution of a processing using the identified character as in execution of a retrieval processing using the identified character on the Web as a keyword after the startup of the Web browser, for instance.

Furthermore, the information to be input with the touch pen and identified is not restricted to characters but may be intended for graphics (for example, a graphic drawing a camera is identified as "photo" to start the camera application if any). In addition, a locus surrounding a character or the like with the finger is not restricted to a graphic such as a circle if it can recognize a certain region, and a certain region is preferably set based on the drawn locus, for example, an auxiliary line connecting both ends is drawn to close a surrounded part even if a locus having the surrounded part closed is not drawn.

In the third example described above, the processing using the information such as the character input with the touch pen is executed immediately. In the same manner as in the first example, however, the processing for demanding the operation for executing the processing using the information such as the character may be executed, more specifically, a selection button for selecting any of the processings may be output to the touch screen 20 (for example, if "camera" is input, selection buttons of "photo" and "video" are output to cause the user to select one of them).

FIGS. 11 and 12 show, as flowcharts, a processing flow based on an information input control program which is operated in the information processing device according to the present invention described above.

The information input control program according to the present invention is started by triggering startup of a predetermined application program such as paint software (or startup of an information processing device such as a tablet type computer or a smart phone). First of all, as shown in the flowchart of FIG. 11, when input of some information is detected on the touch screen (S01), it is identified whether input means is a touch pen or a finger (S02).

If the input means is the touch pen, a locus drawn with the touch pen is output to the touch screen (S03). Then, presence of next input is monitored (S01) until the application program triggering the startup is ended (S12).

If the input means is the finger, a locus drawn on the touch screen with the finger is output to the touch screen (S04) and a region (a surrounded region) designated by the locus drawn with the finger is recognized (S05). It is confirmed whether the information input with the touch pen is displayed in the recognized region (the surrounded region) (S06). If the information input with the touch pen is displayed, it is identified to execute a processing related to information identified as the information input with the touch pen, for example, a processing using the identified information, a processing specified by the identified information or the like (S07). Thereafter, the presence of next input is monitored (S01) until the application program triggering the startup is ended (S12).

If the information input with the touch pen is not displayed in the recognized region on the touch screen, the process proceeds to the flowchart of FIG. 12. There is monitored presence of the input with the touch pen into a range of the recognized region (surrounded region) (S08). When it is detected that there is no input and an operation for erasing the surrounded region on the touch screen is executed (S11), presence of next input is monitored (S01) until the application program triggering the startup is ended (S12). The presence of the input into the range of the surrounded region with the touch pen is monitored until the surrounded region is erased (S08).

When the input with the touch pen is detected in the surrounded region, a locus drawn with the touch pen is output to the touch screen (S09) to execute a processing related to information identified as the information input with the touch pen, for example, a processing for identifying the information input with the touch pen and using the identified information, a processing specified by the identified information or the like (S10). Then, the presence of next input is monitored (S01) until the application program triggering the startup is ended (S12).

Figure 13:
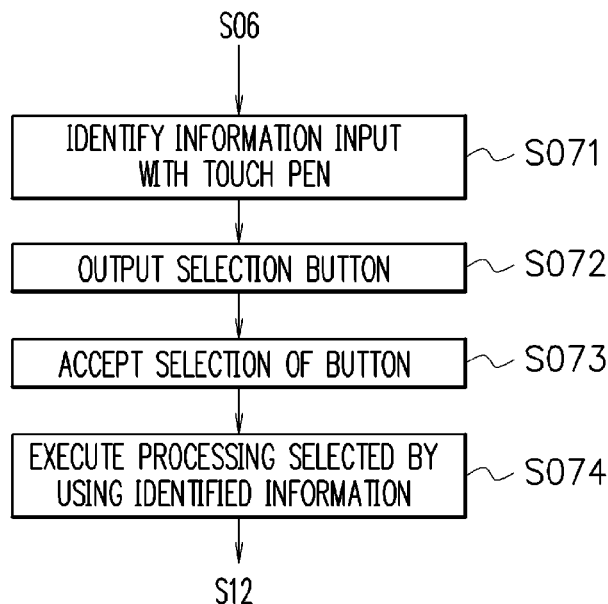
FIG. 13 is a flowchart showing a first example of a detailed flow in S07 of the flowchart illustrated in FIG. 11.
Figure 14:
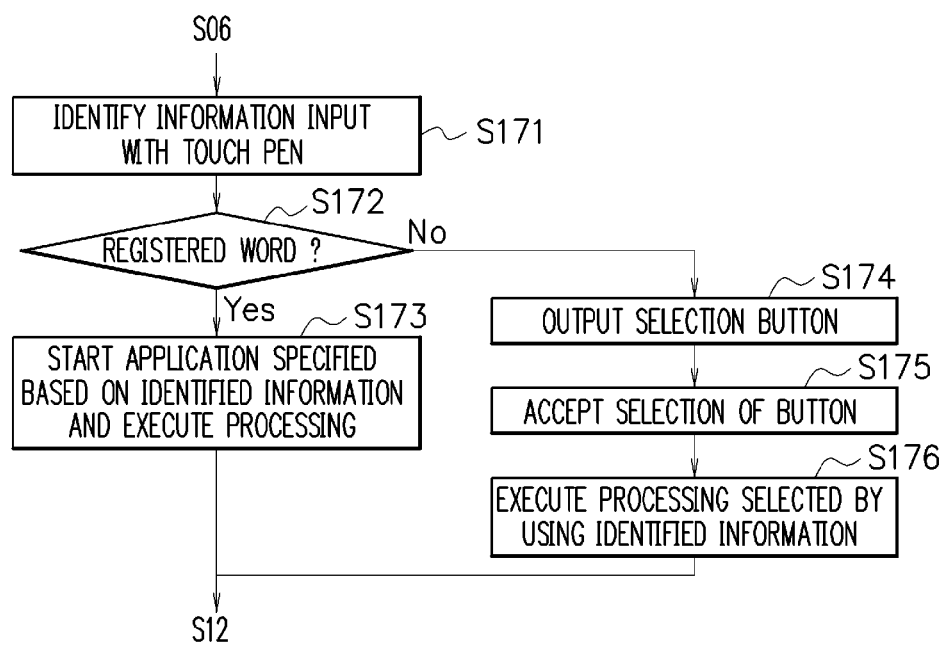
FIG. 14 is a flowchart showing a second example of the detailed flow in the S07 of the flowchart illustrated in FIG. 11.

Referring to the detailed flow in the S07 of the flowchart shown in FIG. 11, a flowchart of FIG. 13 shows a first example and a flowchart of FIG. 14 shows a second example. In the first example shown in FIG. 13, the processing using the identified information is executed as the processing related to the information identified from the information input with the touch pen if the region (the surrounded region) through an input operation with a finger is recognized in a portion in which the information input with the touch pen is displayed. The second example shown in FIG. 14 determines and executes, based on the identified information, which one of the processing using the identified information and the processing specified by the identified information is to be executed.

Referring to the first example shown in FIG. 13, information such as a displayed character or numeral which is input with the touch pen is identified (S071) and a selection button is output to the touch screen (S072). The selection button serves to select any of processings which can be executed by using the identified information, for example, retrieval setting the identified information as a keyword, filing of the identified information and the like. When an operation for selecting any of the selection buttons by the user is accepted (S073), the selected processing is executed by using the identified information for a keyword or the like (S074).

In the S07 of the flowchart shown in FIG. 11, a processing to be executed is determined in order of the input of information with the touch pen and the designation of a region with the finger. In the case in which some processing is to be executed by using the input information, for example, retrieval or edit is carried out by using a character input in paint software or document creating software or the like, generally, there is a tendency that the information is input earlier and the region is designated later. As shown in the first example, therefore, it is suitable that the processing to be executed should be restricted to the processing using the identified information. As in the second example shown in FIG. 14, however, the processing specified by the identified information may be executable.

In the second example shown in FIG. 14, when information such as a character or a numeral displayed by the input with the touch pen is identified (S171), it is decided whether the identified information is relevant to a predetermined registered word corresponding to a predetermined application (S172). If the identified information is relevant to the registered word, an application program specified by the identified information is started to execute the processing (S173).

If the identified information is not relevant to the registered word, a selection button is output to the touch screen (S174). The selection button serves to select any of the processings which can be executed by using the identified information, for example, the retrieval using the identified information as the keyword, the filing of the identified information, and the like. When the selecting operation of any of the selection buttons by the user is accepted (S175), the selected processing is executed by using the identified information for the keyword or the like (S176).

In both the first example and the second example, the processing to be executed by using the identified information is selected by the user through the selection button. However, the step of accepting the output of the selection button and the selecting operation by the user may be omitted to restrict the processing to be executed by using the identified information into a single processing, thereby executing the processing using the identified information immediately.

Figure 15:
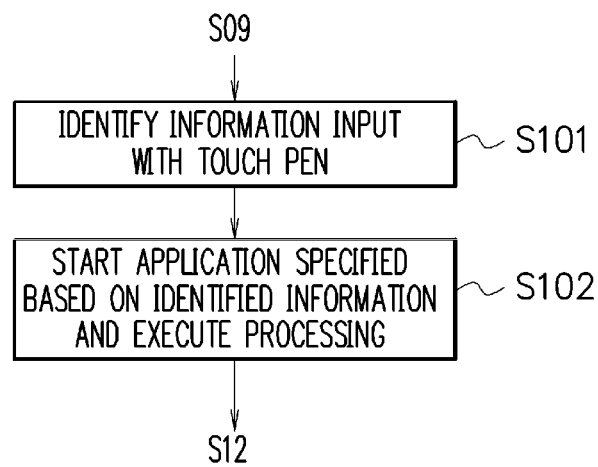
FIG. 15 is a flowchart showing a first example of a detailed flow in S10 of the flowchart illustrated in FIG. 12.
Figure 16:
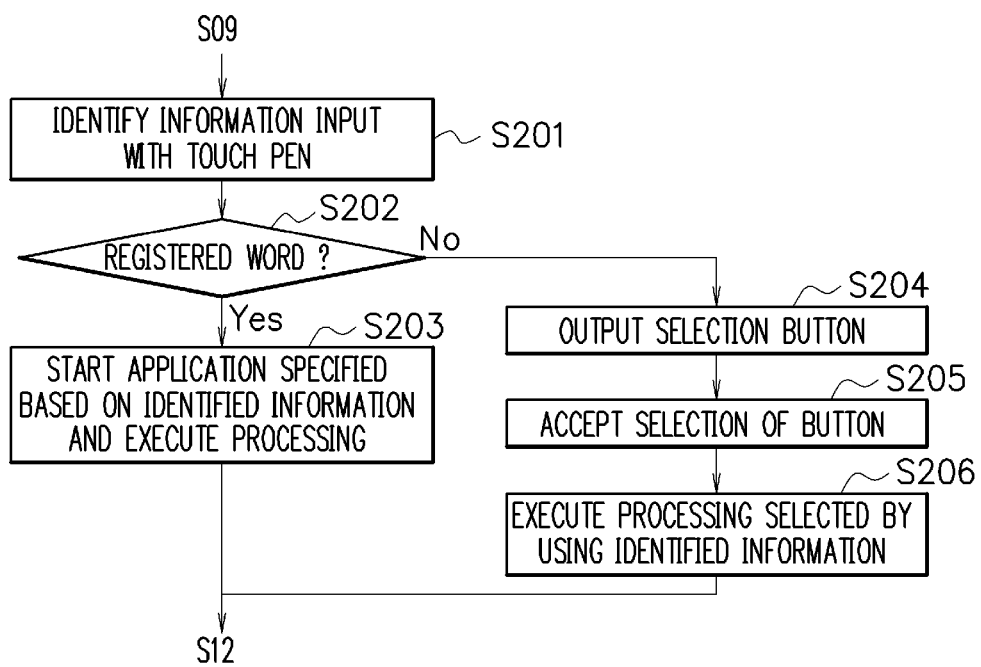
FIG. 16 is a flowchart showing a second example of the detailed flow in the S10 of the flowchart illustrated in FIG. 12.

Referring to the detailed flow in the S10 of the flowchart shown in FIG. 12, a flowchart of FIG. 15 shows a first example and a flowchart of FIG. 16 shows a second example. In the first example shown in FIG. 15, the processing specified by the identified information is executed as the processing related to the identified information from the information input with the touch pen if the information is input with the touch pen into the region (the surrounded region) recognized by the input operation with the finger. The second example shown in FIG. 16 determines and executes, based on the identified information, which one of the processing specified by the identified information and the processing using the identified information is to be executed.

Referring to the first example shown in FIG. 15, information such as a character or numeral input with the touch pen is identified (S101), and an application program specified by the identified information is started to execute a processing (S102). If the application program cannot be specified by the identified information, it is sufficient to execute an error processing, for example, to automatically erase input information after a certain time passes.

In the S10 of the flowchart shown in FIG. 12, processings to be executed is determined in order of the designation of the region with the finger and the input of the information with the touch pen. In the case in which the information to be input serves as a command for starting an application and the information itself is stored and is not utilized, generally, this order tends to be taken. Although it is suitable to restrict the processing to be executed into the processing specified by the identified information as shown in the first example, therefore, it is also possible to execute the processing using the identified information as in the second example shown in FIG. 16.

In the second example shown in FIG. 16, when information such as a character or a numeral input with the touch pen is identified (S201), it is decided whether the identified information is relevant to a predetermined registered word corresponding to a predetermined application (S202). If the identified information is relevant to the registered word, an application program specified by the identified information is started to execute a processing of the application (S203).

If the identified information is not relevant to the registered word, a selection button is output to the touch screen (S204). The selection button serves to select any of the processings which can be executed by using the identified information, for example, the retrieval using the identified information as the keyword, the filing of the identified information, and the like. When the selecting operation of any of the selection buttons by the user is accepted (S205), the selected processing is executed by using the identified information for the keyword or the like (S206).

The processing to be executed by using the identified information according to the second example is selected by the user through the selection button. However, the steps of outputting the selection button and accepting the selection by the user may be omitted to restrict the processing to be executed by using the identified information into a single processing, thereby executing the processing using the identified information immediately.

EXPLANATION OF DESIGNATION

10 tablet type computer body
11 input/output control unit
12 input means identifying unit
13 application executing unit
14 application setting unit
20 touch screen

The invention claimed is:

1. A method for controlling a touch screen input device having a display, the method comprising:
   first receiving a first input of a command instruction in response to interaction of either a finger or stylus with the display;
   displaying the input command instruction on the display;
   first determining whether an input source of the command instruction originated is the finger or the stylus;
   second receiving as second input an at least partial encirclement of a region on the display, the second input originating by the other one of the finger or the stylus;
   second determining whether an input source of the at least partial encirclement is the finger or the stylus;
   executing the command instruction in response to (a) the partial encirclement at least partially enclosing the command instruction and (b) the detected input source of one of the command instruction and the partial encirclement is the finger and the detected input source of the other of the command instruction and the partial encirclement is the stylus;
   wherein the device is programmed not to perform the executing step in response to both the command instruction and the partial encirclement being input by a same detected input source.

2. An input device programmed to operate in response to either a finger or a stylus, the device comprising:
   a touch screen display responsive to input from the finger and the stylus;
   the device being programmed to respond to input on the touch screen display, the response comprising:
      first receiving a first input of a command instruction in response to interaction of either a finger or stylus with the display;
      displaying the input command instruction on the display;

first determining whether an input source of the command instruction originated is the finger or the stylus;

second receiving as second input an at least partial encirclement of a region on the display, the second input originating by the other one of the finger or the stylus;

second determining whether an input source of the at least partial encirclement is the finger or the stylus;

executing the command instruction in response to (a) the partial encirclement at least partially enclosing the command instruction and (b) the detected input source of one of the command instruction and the partial encirclement is the finger and the detected input source of the other of the command instruction and the partial encirclement is the stylus;

wherein the device is programmed not to perform the executing step in response to both the command instruction and the partial encirclement being input by a same detected input source.

* * * * *